United States Patent
Czarnecki et al.

(10) Patent No.: US 6,784,356 B1
(45) Date of Patent: Aug. 31, 2004

(54) PHASE CHANGE MATERIAL WITH INHIBITOR AND A METHOD OF MAKING THE SAME

(75) Inventors: David John Czarnecki, Racine, WI (US); James Thomas Kinscher, Saukville, WI (US); James A. Robinson, Franklin, WI (US)

(73) Assignee: Modine Manufacturing Company, Racine, WI (US)

( * ) Notice: Subject to any disclaimer, the term of this patent is extended or adjusted under 35 U.S.C. 154(b) by 0 days.

(21) Appl. No.: 09/289,571

(22) Filed: Apr. 9, 1999

(51) Int. Cl.[7] .................. H01L 35/12; H01L 35/34; F28D 15/00; C09K 3/18

(52) U.S. Cl. .............. 136/236.1; 136/201; 165/104.21; 165/104.33; 252/70

(58) Field of Search ........................... 136/236.1, 242, 136/201; 252/70; 165/104.21, 104.33; 429/231.95

(56) References Cited

U.S. PATENT DOCUMENTS

| | | | | |
|---|---|---|---|---|
| 2,677,664 A | * | 5/1954 | Telkes | 252/70 |
| 4,258,677 A | * | 3/1981 | Sanders | 123/142.5 |
| 4,292,189 A | * | 9/1981 | Chen | 252/70 |
| 4,404,113 A | * | 9/1983 | Peters et al. | 252/75 |
| 4,508,684 A | * | 4/1985 | Huff et al. | 422/8 |
| 4,878,963 A | * | 11/1989 | Bibber | 148/262 |
| 5,358,626 A | * | 10/1994 | Gandman et al. | 208/48 R |
| 5,591,374 A | * | 1/1997 | Kniep et al. | 252/70 |
| 5,643,493 A | * | 7/1997 | Connor et al. | 252/75 |
| 5,731,568 A | * | 3/1998 | Malecek | 219/209 |
| 5,759,510 A | * | 6/1998 | Pillai | 423/599 |
| 5,785,884 A | | 7/1998 | Hammond | 252/70 |
| 6,083,418 A | * | 7/2000 | Czarnecki et al. | 252/70 |

FOREIGN PATENT DOCUMENTS

DE  19619810  11/1996

* cited by examiner

*Primary Examiner*—Wayne A. Langel
*Assistant Examiner*—Jonas N. Strickland
(74) *Attorney, Agent, or Firm*—Wood, Phillips, Katz, Clark & Mortimer (57) ABSTRACT

A phase change material is made by the process including the steps of providing a composition of a metal nitrate and water and adding tetraborate. This phase change material may be used in a heat battery.

32 Claims, 6 Drawing Sheets

PHASE CHANGE MATERIAL WITH INHIBITOR AND A METHOD OF MAKING THE SAME

FIELD OF THE INVENTION

The present invention is directed to a phase change material and a method of making the same, and in particular to a phase change material with an inhibitor to acid formation and a method of making the same.

BACKGROUND OF THE INVENTION

It is recognized in the art that it is desirable to equip a vehicle having an internal combustion engine with a mechanism to store the thermal energy produced during the operation of the engine for use during subsequent start-ups. For example, the stored thermal energy can be used to reduce or eliminate the traditional lag between the supply of and the demand for thermal energy to increase the air temperature of the passenger compartment. Additionally, the thermal energy can be used to preheat the engine so as to reduce the noxious emissions produced.

One such mechanism used to store thermal energy is a latent heat battery. A latent heat battery includes first and second chambers in thermal communication with each other. Coolant from the vehicle coolant system passes through the first chamber, while a material, known as a phase change material, is disposed in the second chamber. During operation of the engine, thermal energy is transferred from the coolant in the first chamber to the phase change material in the second chamber, causing the phase change material to transform between first and second phases, typically solid and liquid phases. When desired, thermal energy is transferred from the phase change material to the coolant as the phase change material transforms between liquid and solid phases.

One common phase change material used in latent heat batteries is a mixture of lithium nitrate ($LiNO_3$) and magnesium nitrate hexahydrate ($Mg(NO_3)_2 \cdot 6H_2O$). The hydrolysis of the magnesium nitrate leads to the formation of nitric acid by the reaction:

$$Mg(NO_3)_2 + 2H_2O \rightleftharpoons 2HNO_3 + Mg(OH)_2$$

The acid thus formed may corrode the walls of the phase change material chamber, typically made of aluminum.

Although aluminum readily forms a protective layer or passivation film of aluminum oxide ($Al_2O_3$) on the surface of the wall, because the aluminum is exposed to an aqueous solution (i.e. the phase change material), the thermodynamic conditions for the maintenance of the passivation film are pH dependent. While passivation in aluminum exposed to an aqueous solution may occur at a pH as low as 4, phase change materials should ideally be buffered to a pH of between 5 and 8.

Currently, lithium phosphate ($Li_3PO_4$) is used as an inhibitor in the conventional lithium nitrate:magnesium nitrate hexahydrate phase change material. The lithium phosphate reacts with the magnesium nitrate to form magnesium hydroxide, which can inhibit the formation and evolution of nitric acid. However, the reaction occurs substantially instantaneously, with the magnesium hydroxide precipitating in relatively large clumps. The size of the clumps formed limits the surface area available to interact with the acids formed by the phase change material, which limits the effectiveness of the magnesium hydroxide. Additionally, because of insolubility of magnesium hydroxide in the phase change material and the relative densities of magnesium hydroxide and the phase change material, the clumps promptly settle to the bottom of the chamber where the magnesium hydroxide is relatively inactive, thus further reducing what buffering advantage might be otherwise obtained from the hydroxide.

SUMMARY OF THE INVENTION

According to an aspect of the present invention, a phase change material is made by the process including the steps of providing a composition of a metal nitrate and water and adding tetraborate.

According to another aspect of the present invention, a method of making a phase change material includes the steps of providing a composition of a metal nitrate and water and adding tetraborate.

According to a further aspect of the present invention, a phase change material is made by the process including the steps of providing a composition of a Group IA metal nitrate, a Group IIA metal nitrate and water and adding a tetraborate salt.

The step of providing a composition of a Group IA metal nitrate, a Group IIA metal nitrate and water includes the step of providing a composition of lithium nitrate and hydrated magnesium nitrate. The process may also include the step of adding an effective amount of an aqueous material sufficient to cause the densities of the liquid and solid phases of said phase change material to be approximately equal during phase transformation.

Alternatively, the step of providing a composition of a Group IA metal nitrate, Group IIA metal nitrate and water includes the step of providing a composition of lithium nitrate, hydrated magnesium nitrate, and an effective amount of an aqueous material sufficient to cause the densities of the liquid and solid phases of said phase change material to be approximately equal during phase transformation.

The step of adding a tetraborate salt may include the step of adding sodium tetraborate, for example, in the form of sodium tetraborate decahydrate. In fact, the step of providing a composition of a Group IA metal nitrate, Group IIA metal nitrate and water may include the step of providing a composition of lithium nitrate and hydrated magnesium nitrate, and the step of adding a tetraborate salt may include the step of adding an effective amount of a hydrated tetraborate salt (e.g., sodium tetraborate decahydrate) such that the water added to the phase change material by the hydrated tetraborate salt is sufficient to cause the densities of the liquid and solid phases of said phase change material to be approximately equal during phase transformation.

The process may also include the step of adding a strong base, for example, lithium hydroxide, sodium hydroxide, barium hydroxide, or potassium phosphate. Further, the process may include the step of adding an oxidizer, for example, a permanganate salt (e.g., potassium permanganate) or a molybdate salt. Also, the process may include the step adding an inhibitor such as a silicate (e.g., metasilicate) or silicic acid.

According to yet another aspect of the present invention, a method of making a phase change material includes the steps of providing a composition of a Group IA metal nitrate, a Group IIA metal nitrate and water, and adding a tetraborate salt.

Preferably, the step of providing a composition of a Group IA metal nitrate, a Group IIA metal nitrate and water includes the step of providing a composition of lithium nitrate and magnesium nitrate hexahydrate.

The step of adding a tetraborate salt may include the step of adding sodium tetraborate, for example, in the form of sodium tetraborate decahydrate.

The process may also include the step of adding a strong base selected from the group consisting of lithium hydroxide, sodium hydroxide, barium hydroxide, and potassium phosphate. Similarly, the process may include the step of adding an oxidizer selected from the group consisting of permanganate salts and molybdate salts. Further, the process may include step of adding an inhibitor selected from the group consisting of silicates and silicic acid.

According to a still further aspect of the present invention, a heat battery includes a passage through which a working fluid may pass, a container in heat exchange relationship with the passage, and a phase change material disposed in the container and formed from a Group IA metal nitrate, a Group IIA metal nitrate, water and a tetraborate salt.

The phase change material may be formed from lithium nitrate, magnesium nitrate hexahydrate, and sodium tetraborate. Additionally, the phase change material may further include a strong base selected from the group consisting of lithium hydroxide, sodium hydroxide, barium hydroxide, and potassium phosphate. Also, the phase change material may further include an inhibitor selected from the group consisting of silicates and silicic acid. The phase change material may further include an oxidizer selected from the group consisting of permanganate salts and molybdate salts.

DETAILED DESCRIPTION OF EMBODIMENTS OF THE INVENTION

According to an embodiment of the present invention, a phase change material may be prepared by adding a tetraborate ($B_4O_7$) inhibitor to a composition of metal nitrate and water. The phase change material may be prepared by adding the tetraborate inhibitor in the form of a tetraborate salt, for example sodium tetraborate ($Na_2B_4O_7$). Alternatively, the phase change material may be prepared by adding the tetraborate inhibitor in the form of a hydrated tetraborate salt, for example sodium tetraborate decahydrate ($Na_2B_4O_7 \cdot 10H_2O$). In either case, sodium tetraborate makes up preferably approximately 0.3% by weight of the total materials used to prepare the phase change material.

As an example, a phase change material according to the present invention may be prepared by adding sodium tetraborate to a composition of a Group IA metal nitrate (e.g. lithium nitrate) and a Group IIA metal nitrate, preferably a hydrated Group IIA metal nitrate (e.g. magnesium nitrate hexahydrate). Additional water may be present in the composition or may be added to the phase change material as is necessary to substantially reduce the density change of the resultant phase change material occurring during phase transformation. That is, with the addition of aqueous material to a composition of a Group IA metal nitrate and a Group IIA metal nitrate, the densities of the solid and liquid phases at the melting point temperature can be made approximately equal. For example, for a composition of lithium nitrate and magnesium nitrate hexahydrate in a weight ratio of 85.3:14.7, at least approximately 39 percent by weight of the phase change material should be water to density stabilize the phase change material. The density of this phase change material in both the liquid and solid phases during phase transformation is approximately 1.57 g/ml. Additional information on the formulation and preparation of density stabilized phase change materials can be found in U.S. patent application Ser. No. 09/088,631, the entire disclosure of which is hereby incorporated by reference.

As another example, a phase change material may be prepared by adding sodium tetraborate decahydrate to a composition of lithium nitrate and magnesium nitrate hexahydrate. In this phase change material, the aqueous material necessary to substantially reduce the density change during phase transformation may be substantially provided by the hydrated sodium tetraborate, or by the hydrated sodium tetraborate and such additional aqueous material as is necessary to density-stabilize the phase change material.

According to another embodiment of the present invention, a phase change material may be prepared by adding one or more additional inhibitors to the metal nitrate, water and tetraborate inhibitor. Such additional inhibitors may be added to further buffer the pH of the phase change material, to plate out to form a diffusion barrier, or to oxidize aluminum. While several specific additional inhibitors have been provided below, the listing is by no means exhaustive, and is provided for illustrative purposes only.

The additional inhibitor may be a base or a mixture of bases, or more preferably a strong base or mixture of strong bases, which assist in buffering the phase change material. A strong base is a material which, when dissolved in water at 25° C. at a strength of 0.01 M, normally yields a pH of 10 or greater. For example, lithium hydroxide (LiOH), sodium hydroxide (NaOH), barium hydroxide ($Ba(OH)_2$), and potassium phosphate ($K_3PO_4$) are strong bases which could be used to prepare an embodiment of the phase change material according to the present invention. Most preferably, the strong base used is lithium hydroxide because of its low molecular weight, allowing for a large equivalence of base at a relatively small weight addition. Also, lithium is the same cation as is present in the hydrated magnesium nitrate:lithium nitrate composition used to form the phase change material.

The additional inhibitor may also be a silicate, for example, orthosilicate ($SiO_4$) or metasilicate ($SiO_3$), or silicic acid ($H_2SiO_3$). Silicates are strong bases, and, as mentioned above, a strong base may be combined advantageously with the tetraborate inhibitor to buffer the phase change material. However, it is not necessary to add the silicate to the phase change material, but silicic acid may be added instead, and allowed to hydrolyze to form the silicate. Consequently, one may either introduce the base, silicate, or the acid, silicic acid, into the phase change material as the additional inhibitor.

Moreover, the additional inhibitor may be an oxidizer. An oxidizer supplies oxygen to repair the aluminum oxide ($Al_2O_3$) film on the aluminum wall of the phase change material chamber. Oxidizers such as molybdate ($MoO_4^{-2}$) and permanganate ($MnO_4^-$) may be added to the metal nitrate, water and tetraborate inhibitor, preferably in the form of a sodium, potassium or magnesium salt. Potassium permanganate is particularly suitable as this salt is soluble in aqueous systems.

It is believed that the use of a tetraborate inhibitor is advantageous in two ways. First, the tetraborate inhibitor buffers the phase change material at a pH of about 5, within the pH range of 5 to 8 in which aluminum remains passivated. Second, the tetraborate inhibitor is believed to solubilize additional base inhibitors, prolonging the period over which the base inhibitors are effective as a buffer for the phase change material.

Specifically, it is believed that the tetraborate inhibitor solubilizes the base inhibitors according to a two-step process. First, upon addition of the tetraborate, an equilibrium reaction is created between the tetraborate and boric acid. That is:

$$B_4O_7^{-2} + 2H^+ + 5H_2O \leftrightharpoons 4H_3BO_3$$

Second, the boric acid dissolves the magnesium hydroxide formed by the base, creating an equilibrium reaction between the boric acid and the magnesium hydroxide. This reaction helps to keep most of the magnesium hydroxide in solution, and in turn, the base in solution.

Moreover, any magnesium hydroxide precipitated in the phase change material by the inhibitors mentioned above is of substantially smaller particle size than that precipitated when lithium phosphate is added, with a consequential, significant improvement in buffering. Specifically, the smaller magnesium hydroxide particles tend to remain suspended in the phase change material for a longer amount of time, and increased surface area thereof is available for reaction with the nitric acid.

With respect to the method of making the phase change material according to the present invention, a composition of lithium nitrate and magnesium nitrate hexahydrate is heated to a molten state. Sodium tetraborate decahydrate is added to the molten salt as a fine powder, and the mixture is agitated constantly. Following dissolution of the tetraborate, the base, acid, and/or oxidizer is added, preferably along with a sufficient amount of water to substantially reduce the density change of the resultant phase change material during phase transformation (if a sufficient amount of water has not already been added through the inclusion of the hydrated sodium tetraborate). The mixing rate and concentration of the base (or its counterpart acid) can be used to control the particle size of the magnesium hydroxide reaction product to be formed by the base. Alternatively, the molten lithium nitrate:hydrated magnesium nitrate composition, sodium tetraborate, base, acid and/or oxidizer and water may be combined together at the same time with constant agitation.

COMPARATIVE TESTING

Five groups of phase change materials according to embodiments of the present invention were prepared according to the method outlined above. All of the phase change materials were prepared by combining: a) a composition of magnesium nitrate hexahydrate and lithium nitrate at or near a composition of 83.7:16.3 by weight percent, b) a tetraborate inhibitor, and c) a sufficient amount of water to density-stabilize the phase change material. The phase change materials of Group 1 were prepared using only the tetraborate inhibitor, while the phase change materials of Groups 2, 3, and 4 were prepared using the tetraborate, strong base and oxidizer inhibitors and the phase change materials of Group 5 were prepared using the tetraborate and silicate or silicic acid inhibitors. Variations were made in the concentrations of the constituents of the phase change materials of each group.

GROUP 1

TETRABORATE
0.05% $Na_2B_4O_7$
0.135% $Na_2B_4O_7$

GROUP 2

TETRABORATE AND STRONG BASE—$Ba(OH)_2$
0.3% $Na_2B_4O_7$+0.1% $Ba(OH)_2$
0.2% $Na_2B_4O_7$+0.07% $Ba(OH)_2$+0.07% $KMnO_4$
0.15% $Na_2B_4O_7$+0.05% $Ba(OH)_2$+0.05% $Na_2MoO_4$+0.05% $KMnO_4$

GROUP 3

TETRABORATE AND STRONG BASE—LiOH
0.3% $Na_2B_4O_7$+0.1% LiOH
0.3% $Na_2B_4O_7$+0.06% LiOH

GROUP 4

TETRABORATE AND STRONG BASE—$K_3PO_4$
0.2% $Na_2B_4O_7$+0.15% $K_3PO_4$+0.1% $Na_2MoO_4$
0.2% $Na_2B_4O_7$+0.1% $K_3PO_4$+0.07% $Na_2MoO_4$
0.2% $Na_2B_4O_7$+0.2% $K_3PO_4$

GROUP 5

TETRABORATE AND SILICATE/SILICIC ACID
0.2% $Na_2B_4O_7$+0.1% $Na_2SiO_3$
0.3% $Na_2B_4O_7$+0.1% $H_2SiO_3$

Test canisters were prepared by placing approximately 30 ml of a phase change material according to the present invention into a 40 ml aluminum canister along with an approximately 10 g aluminum specimen. The canister was then sealed. Control canisters were also prepared by placing approximately 30 ml of a mixture of a magnesium nitrate hexahydrate:lithium nitrate salt and a lithium phosphate inhibitor into a 40 ml aluminum canister with an approximately 10 g aluminum specimen. These canisters were also sealed. Pressure measurements were periodically taken of the internal pressure within the canister.

The results of the testing are illustrated in FIGS. 1–5 for Groups 1–5, respectively. For each of the groups, the canisters filled with phase change materials according to the present invention showed generally lower pressures than the canisters filled with the mixture of the salt and the lithium phosphate inhibitor. Most significantly, the increase in pressure over time is more gradual in the canisters filled with the phase change materials according the present invention than for the mixture of the salt and the lithium phosphate inhibitor.

EXEMPLARY APPLICATION

One preferred application for the phase change material according to the present invention is as a thermal energy storage medium for a latent heat battery.

Figure 1:
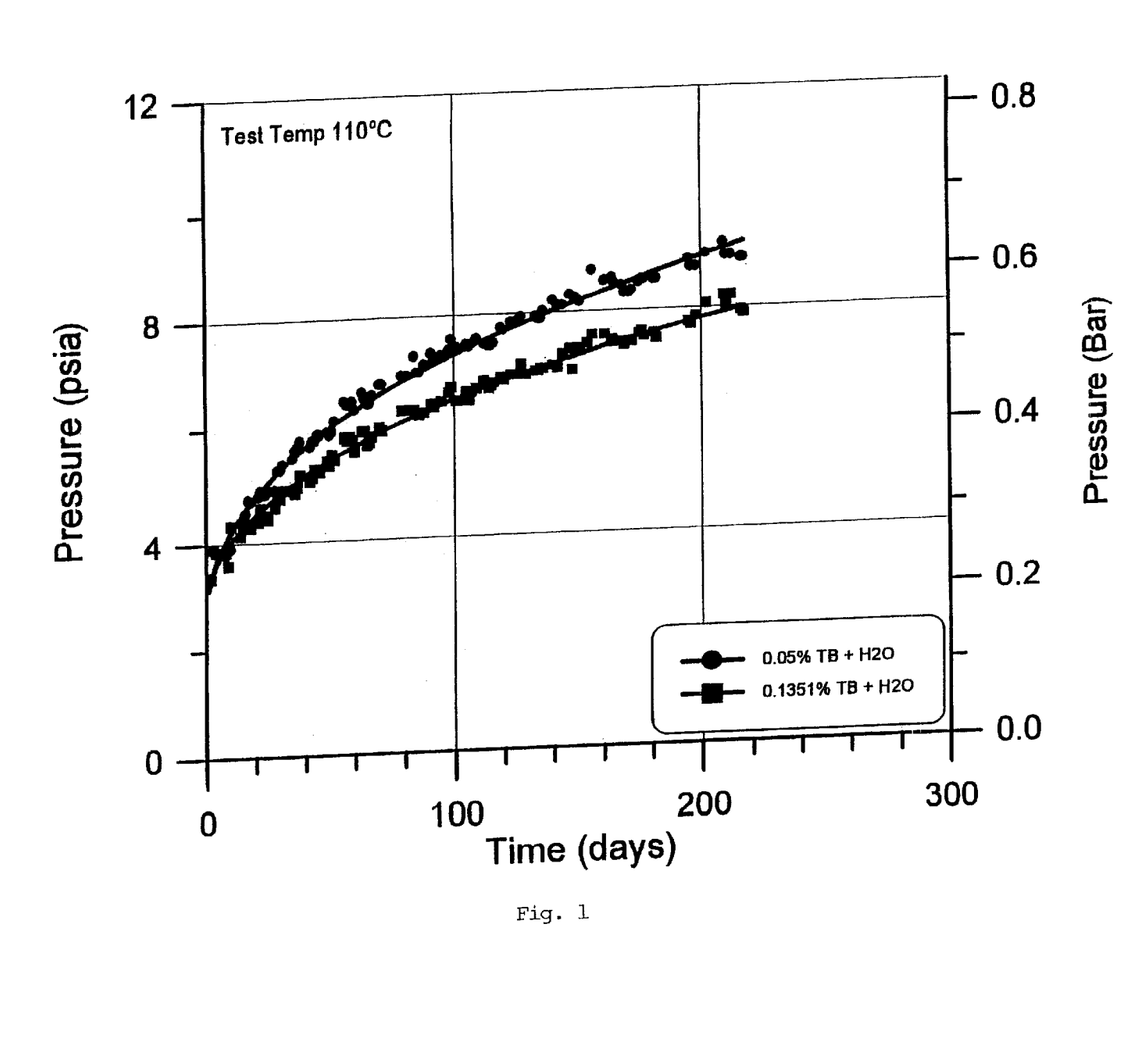
FIG. 1 is a graph of the results of tests performed on several embodiments of a phase change material according to the present invention with a tetraborate inhibitor.
Figure 2:
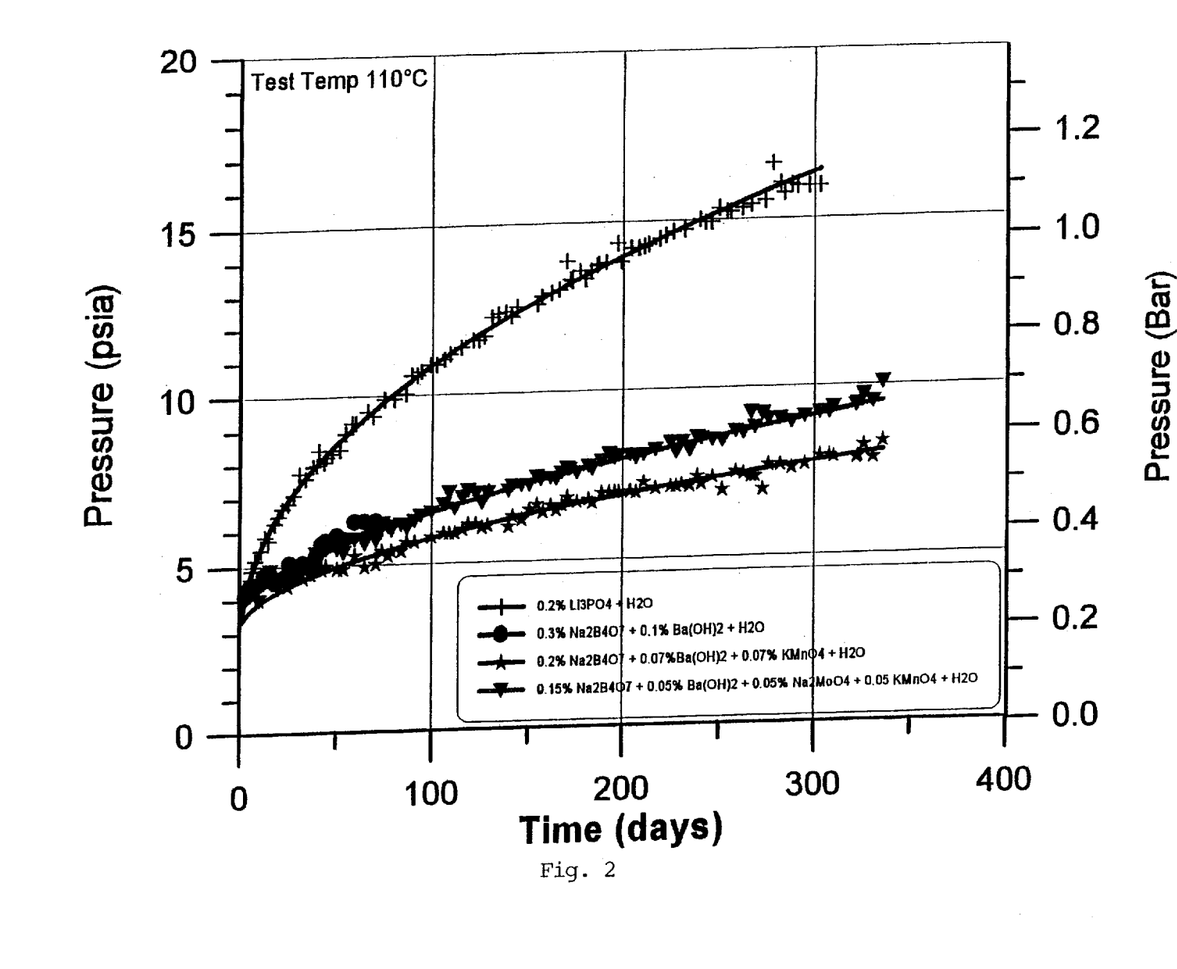
FIG. 2 is a graph of the results of tests performed on several embodiments of a phase change material according to the present invention with tetraborate and barium hydroxide inhibitors.
Figure 3:
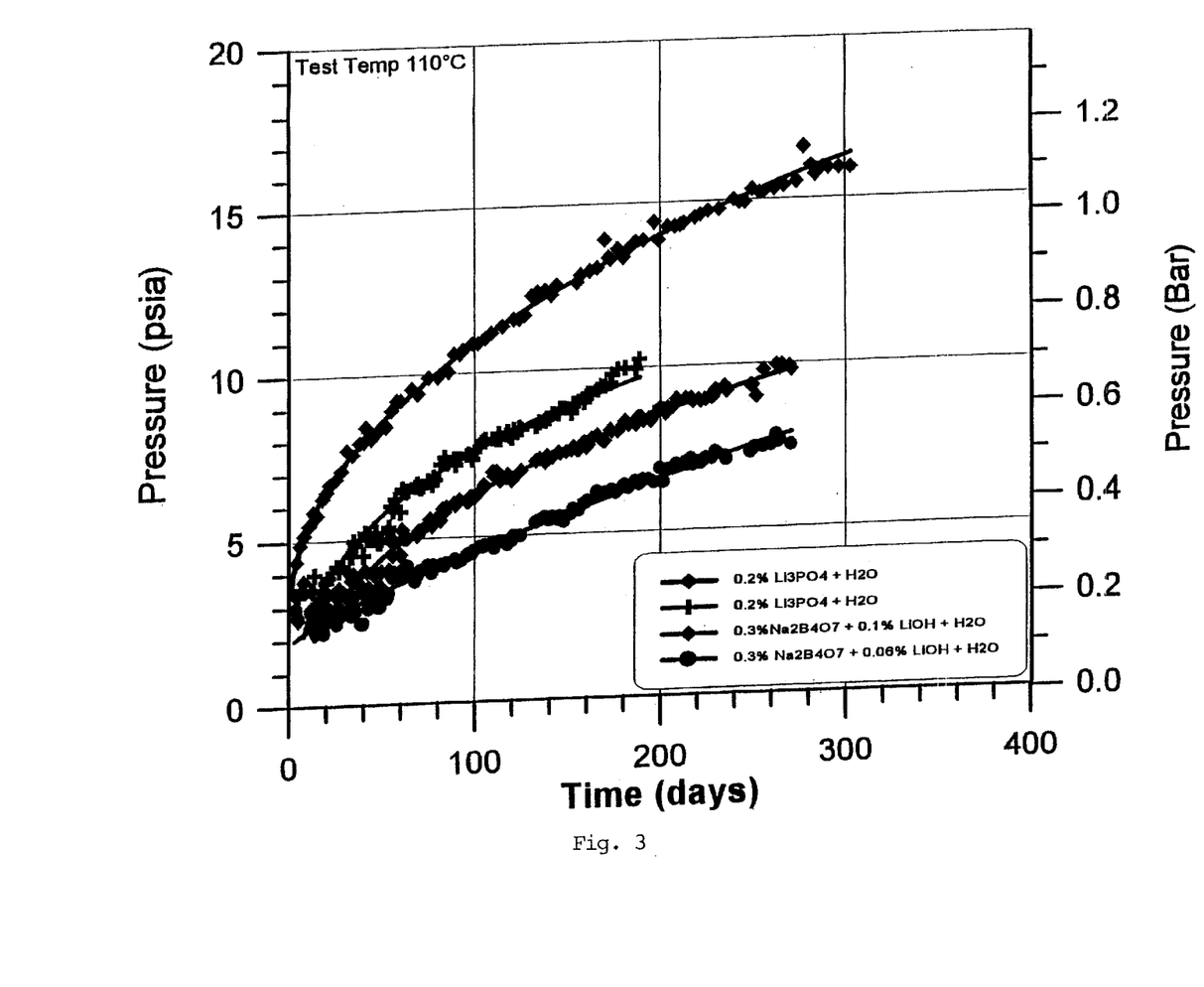
FIG. 3 is a graph of the results of tests performed on several embodiments of a phase change material according to the present invention with tetraborate and lithium hydroxide inhibitors.
Figure 4:
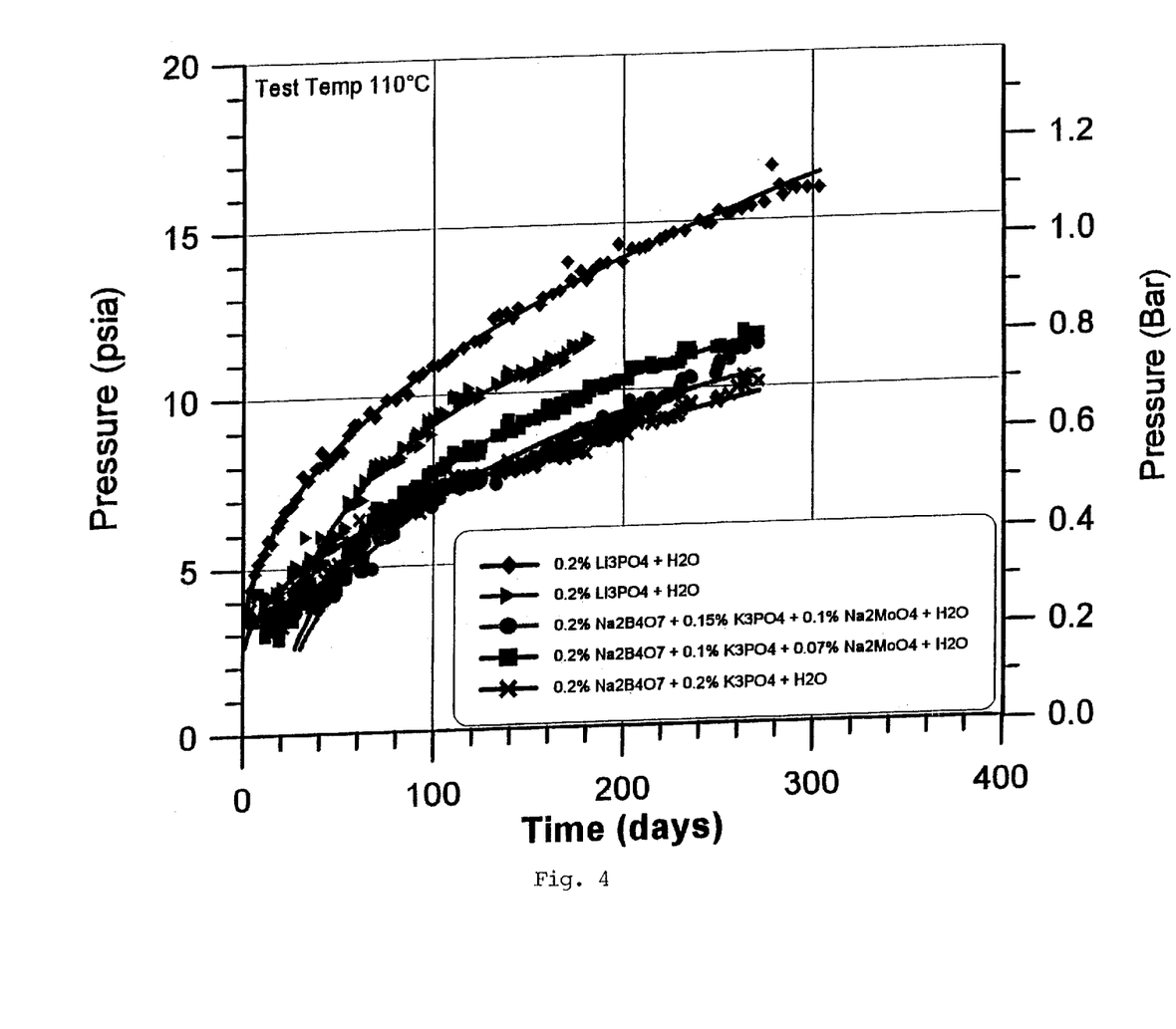
FIG. 4 is a graph of the results of tests performed on several embodiments of a phase change material according to the present invention with tetraborate and potassium phosphate inhibitors.
Figure 5:
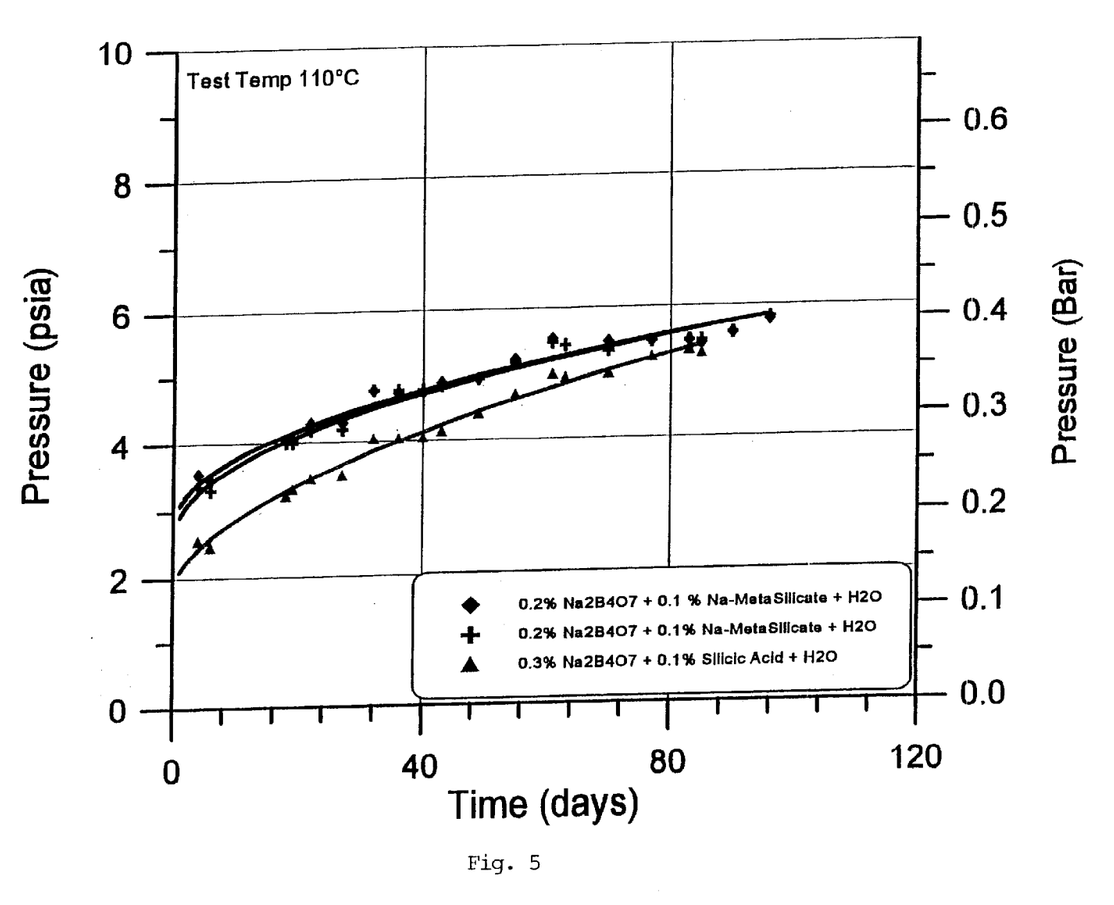
FIG. 5 is a graph of the results of tests performed on several embodiments of a phase change material according to the present invention with tetraborate and silicate or silicic acid inhibitors.
Figure 6:
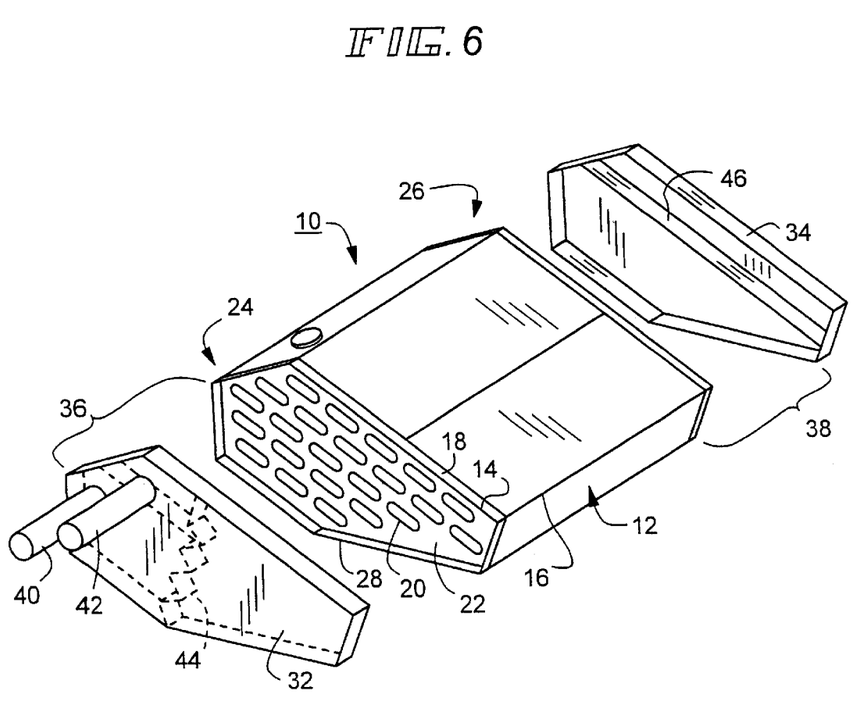
FIG. 6 is a perspective view of a latent heat battery using a phase change material according to the present invention.

The heat battery, indicated as 10, includes a central housing 12 with an inner container 14 and an outer container 16, the inner container 14 being disposed within the outer container 16 with a first or insulating space 18 therebetween which may be filled with an insulation material or subject to a vacuum. A plurality of tubes 20 are arranged in the inner container 14, defining a second space 22 between the tubes 20 which is filled with the density stabilized phase change material. The heat battery 10 may also include a plurality of fins (not shown) which extend between the plurality of tubes 20.

The ends 24, 26 of the central housing 12 are sealed by end plates, of which a left end plate 28 is shown. The end plates also cooperate with covers or tanks 32, 34 to define header and tank constructions 36, 38 at both ends of the central housing 12 which are in fluid communication with the plurality of tubes 20.

In particular, the cover 32 has an inlet 40 and an outlet 42 attached thereto and in fluid communication with the interior space of the header and tank construction 36. Both covers 32, 34 have baffle plates 44, 46. The T-shaped baffle plate 44 (which is shown as one piece, but which could also be an assembly of two pieces) divides the header and tank construction 36 into three chambers, and separates the inlet 40 from the outlet 42. The baffle plate 46 separates the header and tank construction 38 into two chambers. The baffle plates 44, 46 thereby cause the fluid-passing through the header and tank constructions 36,38 and the tubes 20 to follow a serpentine path through the central housing 12.

In operation, a working fluid, such as engine coolant, enters the header and tank construction 36 through the inlet 40 and enters at least one of the tubes 20 disposed in the central housing 12. The working fluid passes through the tubes 20 to the header and tank construction 38, whereupon it enters another of the tubes 20 and returns to the header and tank construction 36. The working fluid then passes through still another of the tubes 20 to the header and tank construction 38, and another of the tubes 20 to the header and tank construction 36. The working fluid exits from the header and tank construction 36 through the outlet 42.

As the working fluid passes through the central housing 12, the working fluid exchanges heat through the walls of the tubes 20 with the phase change material contained in the second space 22. Specifically, if the temperature of the working fluid exceeds the temperature of the phase change material, then energy is transferred to the phase change material to heat the solid phase, to transform the phase change material from the solid phase to the liquid phase or to further heat the liquid phase, thereby storing energy in the battery. If the temperature of the working fluid is less than that of the phase change material, then energy is transferred to the working fluid from the phase change material to heat the fluid and to cool the liquid phase of the phase change material, to transform the phase change material between the liquid phase and the solid phase or to further cool the solid phase, thereby extracting energy from the battery.

As an alternate structure, the phase change material may be placed in sealed canisters within the inner container 14, and the coolant allowed to flow through the inner container 14 and around the sealed canisters.

Still other aspects, objects, applications and advantages of the present invention can be obtained from a study of the specification, the drawings, and the appended claims.

We claim:

1. A heat battery made by the process including the steps of:
   providing a composition comprising a Group IA metal nitrate, a Group IIA metal nitrate and water;
   adding a tetraborate salt to form a phase change material to minimize acid formation and pressure buildup within the phase change material when sealed in a container; and
   placing the phase change material in a sealed container having a passage extending through the container and through which a heat exchange fluid may pass.

2. A heat battery according to claim 1, wherein the step of adding a tetraborate salt comprises the step of adding sodium tetraborate.

3. A heat battery according to claim 1, wherein the step of adding a tetraborate salt comprises the step of adding a hydrated tetraborate salt.

4. A heat battery according to claim 3, wherein the step of adding a hydrated tetraborate salt comprises the step of adding sodium tetraborate decahydrate.

5. A heat battery according to claim 3, wherein the step of providing a composition comprising a Group IA metal nitrate, Group IIA metal nitrate and water comprises the step of providing a composition comprising lithium nitrate and hydrated magnesium nitrate, and the step of adding a hydrated tetraborate salt comprises the step of adding an effective amount of the hydrated tetraborate salt such that the water added to the phase change material by the hydrated tetraborate salt is sufficient to cause the densities of the liquid and solid phases of said phase change material to be approximately equal during phase transformation.

6. A heat battery according to claim 1, further including the step of adding a strong base.

7. A heat battery according to claim 6, wherein the step of adding a strong base comprises the step of adding a base selected from the group consisting of lithium hydroxide, sodium hydroxide, barium hydroxide, and potassium phosphate.

8. A heat battery according to claim 6, further including the step of adding an oxidizer.

9. A heat battery according to claim 8, wherein the step of adding an oxidizer comprises the step of adding an oxidizer selected from the group consisting of permanganate salts and molybdate salts.

10. A heat battery according to claim 9, wherein the step of adding an oxidizer comprises the step of adding potassium permanganate.

11. A heat battery according to claim 1, further including the step of adding an inhibitor selected from the group consisting of silicates and silicic acid.

12. A heat battery according to claim 11, wherein the step of adding an inhibitor comprises the step of adding an inhibitor selected from the group consisting of metasilicate and silicic acid.

13. A phase change material made by the process including the steps of:
   providing a composition comprising a Group IA metal nitrate, a Group IIA metal nitrate and water and comprising the step of providing a composition comprising lithium nitrate and hydrated magnesium nitrate; and
   adding a tetraborate salt to minimize acid formation and pressure build-up within the phase change material when sealed in a container.

14. A heat battery according to claim 13, further including the step of adding an effective amount of an aqueous material sufficient to cause the densities of the liquid and solid phases of said phase change material to be approximately equal during phase transformation.

15. A phase change material made by the process including the steps of:
   providing a composition comprising a Group IA metal nitrate, a Group IIA metal nitrate and water and comprising; and
   adding a tetraborate salt to minimize acid formation and pressure buildup within the phase change material when sealed in a container.

16. A method of making a heat battery including the steps of:
   providing a composition comprising a Group IA metal nitrate, a Group IIA metal nitrate and water;
   adding a tetraborate salt to form a phase change material; and
   placing the phase change material in a sealed container having a passage extending through the container and through which a heat exchange fluid may pass.

17. The method according to claim 16, wherein the step of providing a composition comprising a Group IA metal nitrate, a Group IIA metal nitrate and water comprises the step of providing a composition comprising lithium nitrate and magnesium nitrate hexahydrate.

18. The method according to claim 16, wherein the step of adding a tetraborate salt comprises the step of adding sodium tetraborate.

19. The method according to claim 16, wherein the step of adding a tetraborate salt comprises the step of adding sodium tetraborate decahydrate.

20. The method according to claim 16, further including the step of adding a strong base selected from the group consisting of lithium hydroxide, sodium hydroxide, barium hydroxide, and potassium phosphate.

21. The method according to claim 16, further including the step of adding an oxidizer selected from the group consisting of permanganate salts and molybdate salts.

22. The method according to claim 16, further including the step of adding an inhibitor selected from the group consisting of silicates and silicic acid.

23. A heat battery comprising:
   a passage through-which a working fluid may pass;
   a sealed, aluminum container in heat exchange relationship with the passage; and
   a phase change material disposed in the container and formed from a Group IA metal nitrate, a Group IIA metal nitrate, water and a tetraborate salt.

24. The heat battery according to claim 23, wherein the phase change material is formed from lithium nitrate, magnesium nitrate hexahydrate, and sodium tetraborate.

25. The heat battery according to claim 24, wherein the phase change material further includes a strong base selected from the group consisting of lithium hydroxide, sodium hydroxide, barium hydroxide, and potassium phosphate.

26. The heat battery according to claim 24, wherein the phase change material further includes an inhibitor selected from the group consisting of silicates and silicic acid.

27. The heat battery according to claim 24, wherein the phase change material further includes an oxidizer selected from the group consisting of permanganate salts and molybdate salts.

28. A heat receiving device comprising:
   a sealed, aluminum container; and
   a phase change material disposed in the container and formed from a Group IA metal nitrate, a Group IIA metal nitrate, water and a tetraborate salt.

29. The heat receiving device according to claim 28, wherein the phase change material is formed from lithium nitrate, magnesium nitrate hexahydrate, and sodium tetraborate.

30. The heat receiving device according to claim 29, wherein the phase change material further includes a strong base selected from the group consisting of lithium hydroxide, sodium hydroxide, barium hydroxide, and potassium phosphate.

31. The heat receiving device according to claim 29, wherein the phase change material further includes an inhibitor selected from the group consisting of silicates and silicic acid.

32. The heat receiving device according to claim 29, wherein the phase change material further includes an oxidizer selected from the group consisting of permanganate salts and molybdate salts.

* * * * *